United States Patent [19]
Naville et al.

[11] Patent Number: 6,023,444
[45] Date of Patent: Feb. 8, 2000

[54] METHOD AND DEVICE FOR THE ACQUISITION OF SIGNALS WHILE DRILLING

[75] Inventors: Charles Naville, Grigny; Claude Mabile, Clamart; Jean Guesnon; Patrick Meynier, both of Chatou, all of France

[73] Assignee: Institut Francais du Petrole, Rueil-Malmaison Cedex, France

[21] Appl. No.: 08/770,427

[22] Filed: Dec. 20, 1996

[30] Foreign Application Priority Data

Dec. 22, 1995 [FR] France .................................. 95 15337

[51] Int. Cl.[7] ...................................................... G01V 1/28
[52] U.S. Cl. ............................................... 367/82; 367/40
[58] Field of Search ................................. 367/40, 41, 75, 367/82, 84, 83, 25, 45, 57; 73/152.03; 181/106

[56] References Cited

U.S. PATENT DOCUMENTS

| | | | |
|---|---|---|---|
| 4,216,536 | 8/1980 | More ........................................ | 367/83 |
| 4,675,852 | 6/1987 | Russell et al. ........................... | 367/84 |
| 4,718,048 | 1/1988 | Staron et al. ............................. | 367/40 |
| 4,806,115 | 2/1989 | Chevalier et al. ....................... | 439/194 |
| 4,829,489 | 5/1989 | Rector ...................................... | 367/82 |
| 4,926,391 | 5/1990 | Rector et al. ............................. | 367/41 |
| 4,965,774 | 10/1990 | Ng et al. ................................... | 367/75 |
| 5,758,539 | 11/1996 | Naville et al. ........................... | 73/152.03 |

FOREIGN PATENT DOCUMENTS 2 273 984  7/1994  United Kingdom ............. G01V 1/36

*Primary Examiner*—Christine K. Oda
*Assistant Examiner*—Victor J. Taylor
*Attorney, Agent, or Firm*—Millen, White, Zelano & Branigan, P.C.

[57] ABSTRACT

The present invention relates to a method for the acquisition of signals during a well drilling operation, wherein the following stages are carried out: shakes are generated by means of a vibration source, the signals resulting from the shakes are detected by downhole and surface measuring means (23; 24) connected to a control unit (22), a code for synchronizing the signals acquired by the downhole (7) and surface means (23; 24) is emitted, the signals supplied by the downhole measuring means (7) are stored in a storage module (11), the signals contained in storage module (11) are collected at the surface, then processings are performed on the synchronized downhole and surface signals.

24 Claims, 3 Drawing Sheets

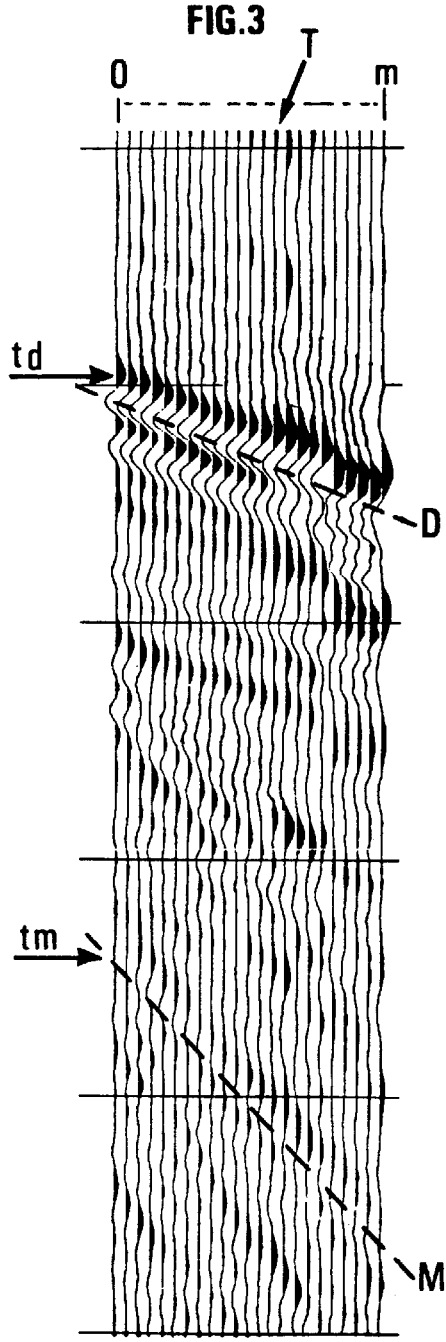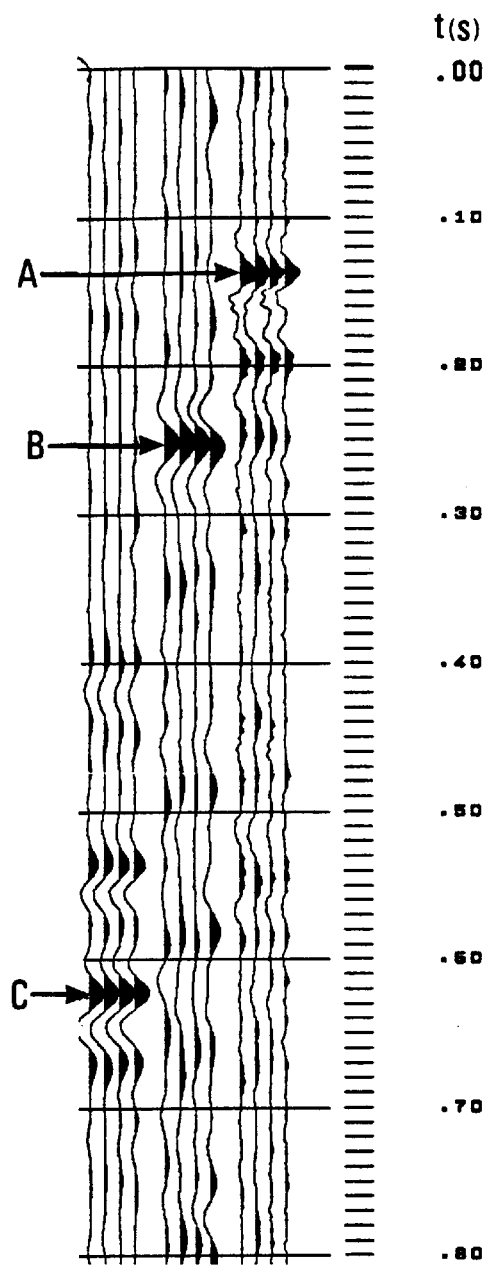

METHOD AND DEVICE FOR THE ACQUISITION OF SIGNALS WHILE DRILLING

FIELD OF THE INVENTION

The present invention relates to a method and to a device for acquiring a great quantity of physical data connected with a subsoil drilling operation. The invention is preferably used to record, in order to process them later, the seismic signals created by a vibration source situated either in the well or at the ground surface. The invention comprises synchronized recording of the vibrational signals of the source and of the vibrational signals that have crossed the geologic formation. Geologic knowledge can thus be deduced by means of the seismic methods applied while drilling, without interfering with the drilling methods and tools.

BACKGROUND OF THE INVENTION

The high information rate acquisition method wherein downhole pickups are connected to the surface by means of an electric conductor is well-known. This method is conventionally implemented by setting, in the inner space of the drill string, a wireline type cable and generally by using a side-entry sub allowing the cable to run through the annular space, thus enabling drillpipe adding operations in order to follow the deepening of the borehole. The presence of the cable is very disadvantageous insofar as the rotary type drilling technique has to be abandoned and replaced by drilling with a downhole motor.

The use of special drillpipes known as "wired" pipes is also well-known, i.e. each pipe comprises an electric link and two end connectors for connecting electrically the pipes as well as the tool joints. The drill string entirely made up of these special pipes is very costly and, furthermore, the multiplicity of contacts (as many contacts as pipes about 10 meters long) is likely to decrease the insulation of the electric line, which might limit the information transmission capacity in case of deep drilling.

Transmissions by pressure waves in the drilling mud or by electromagnetic waves are also well-known. With these techniques, the information rate remains low, in any case incompatible with the continuous transmission of vibrational phenomena, for example the shakes due to a downhole seismic source or the shakes emitted by an impulsive type surface source in order to perform a VSP or Vertical Seismic Profiling.

SUMMARY OF THE INVENTION

The present invention thus relates to a method for the acquisition of signals during a well drilling operation, wherein the following stages are carried out:
  shakes are created by means of a vibration source,
  the signals representative of said shakes are recorded by at least two measuring means, one of the means being placed at the ground surface, the other in a string used for drilling, said surface measuring means being connected, either by radio waves or by an electric link, to surface electronic control means.
In the present method:
  a synchronization code is emitted by the electronic control means, said code is recorded with the signals acquired by the downhole and the surface measuring means, said code emission being performed by means of electromagnetic waves,
  during a time interval, the signals supplied by the downhole measuring means are stored in a storage module,
  at the end of said time interval, the signals contained in the storage module are collected at the ground surface,
  synchronization adjustments are performed between the downhole and surface signals acquired in the same time interval in order to compensate for the drift of the clock of the downhole measuring means in relation to the clock of the surface measuring means. Adjustments are carried out by recording simultaneously, downhole and at the surface, the same synchronization code,
  processings are achieved between the synchronized downhole and surface signals.

The signals contained in the storage module can be recovered at the ground surface by taking the storage module up to the surface.

Said string comprises a drill bit, said rotating bit can form the vibration source, the surface measuring means can be of the geophone type connected to surface control means and the downhole measuring means of the accelerometer type detect the shakes created by the source.

The vibration source can be at the ground surface, the downhole measuring means can comprise pickups detecting the shakes crossing the drilled formations.

Signals guided by the string can be recorded by means of surface pickups placed at the top of said string and connected to the surface control means.

A cable can be lowered into the string, said cable comprising a tool for connection with said storage module.

Said surface electronic means and said storage module can be connected electrically by means of the connecting tool.

The precision of the synchronism of acquisition of the downhole signals and of the surface signals can be corrected by recording the arrival times at the surface, at the top of the string, of the direct guided waves and of the first order multiples.

The invention relates to a device intended for the acquisition of signals during a well drilling operation comprising: a vibration source, downhole measuring means placed in the string, surface measuring means, said surface measuring means being linked, either by radio wave or by an electric link, with surface electronic control means. In the device, said electronic control means include means for emitting a code for synchronizing the signals acquired by the downhole and surface measuring means, said emission means comprising means of transmission by electromagnetic waves. The device includes a storage module in which the signals acquired by the downhole measuring means are stored for a given time interval, and said module comprises means of connection with the downhole pickups and means for collecting the signals at the surface.

In the device, the downhole measuring means can be connected to the storage module by a cable comprising at least one conductor so that the module is at a short distance from the surface, said module including code reception and recording means.

The storage module can comprise at least one electric connector that can be plugged in in a liquid environment.

The invention can be applied to identify the formation layers in the neighbourhood of the drill bit by correlation between the surface signal records and the downhole signal records stored in the storage module.

BRIEF DESCRIPTION OF THE DRAWINGS

Other features and advantages of the present invention will be clear from reading the description hereafter of embodiments given by way of non limitative examples, with reference to the accompanying drawings in which:

FIGS. 3 and 4 illustrate a method of adjusting the synchronization.

DESCRIPTION OF THE PREFERRED EMBODIMENTS

Figure 1:
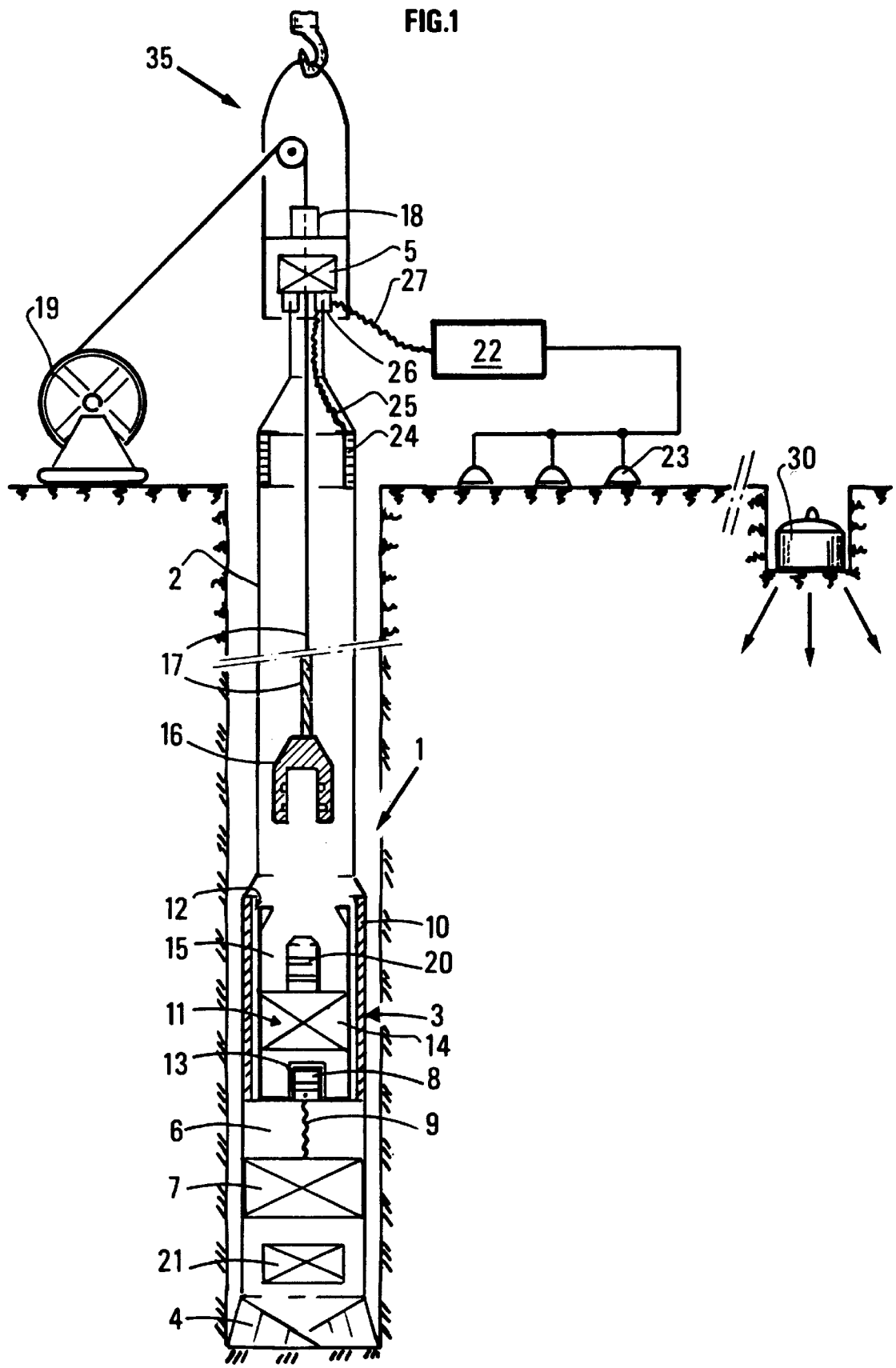
FIG. 1 diagrammatically shows an embodiment.

FIG. 1 shows a device allowing the present invention to be implemented according to a first embodiment. A drill string 1 comprises drillpipes 2 at the end of which drill collars 3 are assembled. A drill bit 4 is driven into rotation by means of drill collars 3, of drillpipes 2 and of a conventional surface installation 35, either by means of a rotary table and a kelly (not shown here), or by a power swivel 5.

The whole of the drill collars 3, commonly referred to as BHA (Bottomhole Assembly), comprises at least one special sub 6 including at least measuring means comprising a pickup 7, of the accelerometer type for example, allowing acquisition of vibrational phenomena created by the coupling of the drill bit with the formation or by any other mechanical means of mechanical coupling of the pickup with the geologic formation. These vibrations are transmitted along the string, the drill collars and the pipes, and they can be mainly due to the vibrations generated by the rotation of the drill bit or by another vibration source included in the drill collars and actuated when the bit lies at the bottom of the well, thus coupling mechanically the source with the formation. In another method of operation of the invention, a seismic source 30 can be activated at the ground surface so as to create shakes that are transmitted through the geologic formation and can be recorded by measuring means 7. The surface vibration source can be a vibration source or an impulsive source.

Sub 6 can be fitted with connecting means 8 in the upper part thereof communicating with the inner channel of the drill collars screwed up above. Other channels lead the drilling fluid towards the drill bit. Connecting means 8 are preferably made up of an electric connector that can be plugged in in the presence of fluid, for example the circulating drilling fluid. This type of connector, well-known in the field of oil production well measurements, is commercially available. Connector 8, which can be single-contact or multi-contact, is connected to the measuring means or to the whole of the electronic acquisition means by one or several electric links 9 that run through sub 6. Sub 6 comprises, in the upper part thereof in relation to said connector 8, a receptacle 10 allowing to set, on said connector, an element 11 preferably cylindrical and whose diameter is compatible with said receptacle and the inner space of all of the tubulars making up the drill string. Once said element 11 is set above sub 6, the annular space 12 defined by the outside of element 11 and the inside of receptacle 10 leads the drilling fluid towards the drill bit.

Element 11 can comprise, at the base thereof, a connector 13 intended to cooperate with connector 8 so as to connect the electronic means 14 included in element 11 to the pickup or pickups 7 of sub 6. Electronic means 14 are mainly made up of storage modules intended to store the signals acquired during operation by pickups 7. The conventional memories, whose storage capacity can range from a few hundred megabytes to several gigabytes, are understandable to the engineer. Element 11 also includes, in the upper part thereof, linking and possibly recovery means 15 whose main function is to connect element 11 from the inside of the drill string by means of a connecting tool 16 fastened to the end of a cable 17. The means for fishing up an element lowered in the inner space of a drill string are well-known and commonly referred to as wireline tools. In a first configuration, cable 17 runs through power swivel 5 by means of a lock chamber 18. In general, the drill string is suspended from the rotary table prior to being unscrewed at the level of the rig floor in order to introduce connecting tool 16 in the inner space of the string. A wireline winch 19 allows the connecting tool to be operated optionally in order to take element 11 up to the surface.

Recovery means 15 can comprise an electric connector 20 cooperating with fishing tool 16 so as to allow an electric link to be achieved between surface means 22 and the downhole electronics: storage means of the electronic means 14, pickup 7 and its associated electronics. In this case, cable 17 is not a simple wireline but, for example, a logging cable comprising at least one electric conductor.

The special sub or subs 6 comprise, besides pickup 7, electric power generation means of the battery or turbine type, at least one clock, converters, filters and an electric or electromagnetic link with electromagnetic means 21 for transmission and reception of information from or towards the ground surface, through the formation. Such electromagnetic means are already in use, notably for transmitting drill bit positioning measurements in order to control the drilling trajectory. They have the advantage of allowing information to be readily sent from the ground surface to a receiving antenna situated close to electromagnetic means 21, at the well bottom.

At the surface, electronic means 22 comprise management electronics for the signals acquired by surface pickups, for example geophones or accelerometers 23, or an instrument-fitted sub 24 placed at the top of the drill string. This instrument-fitted sub can comprise at least one pickup of the same type as pickup 7 placed at the well bottom. Sub 24 is electrically linked with surface electronic means 22 by means of a conventional electric link 25, a rotating contact joint 26 and an electric cable 27. Without departing from the scope of the present invention, a radio link may be provided between sub 24 and electronic means 22. Geophones 23 are generally arranged in line and connected by a common cable to the surface electronic means. Of course, the optional conductors of cable 17 are connected to electronic means 22, notably by means of a rotating electric joint borne by winch 19. This system, well-known in the logging technique, is not shown here.

The surface electronic means 22 comprise, besides means for synchronizing the various signals acquired by the different pickups, surface measuring means, downhole measuring means, in order to locate with sufficient precision in time the signals recorded. Surface electronic means 22 comprise therefore means of emission and control by electromagnetic waves that cooperate with the downhole electronic reception means 21. Through this transmission channel, the electromagnetic communication allows to check and to control the operation of acquisition pickups 7. Furthermore, this communication is advantageously used in the present invention to locate in time the signals recorded and stored in storage module 11, by sending a synchronization code at the beginning of the acquisitions, or at predetermined time intervals.

Without departing from the scope of the present invention, the storage module may be non-removable, as shown in FIG. 1 with connecting means 8, but fixed on or in sub 6, still comprising connecting means, for example of the 20 type. It is also obvious that the electronic units 7, 21, 11 can be placed in drillpipes 2 instead of being placed in the BHA according to the above-mentioned definition. In fact, it can be preferred to set part or all of the downhole electronics (acquisition, supply, reception, storage) at a certain distance from the drill bit, i.e. closer to the surface. This layout can be illustrated by FIG. 2.

Figure 2:
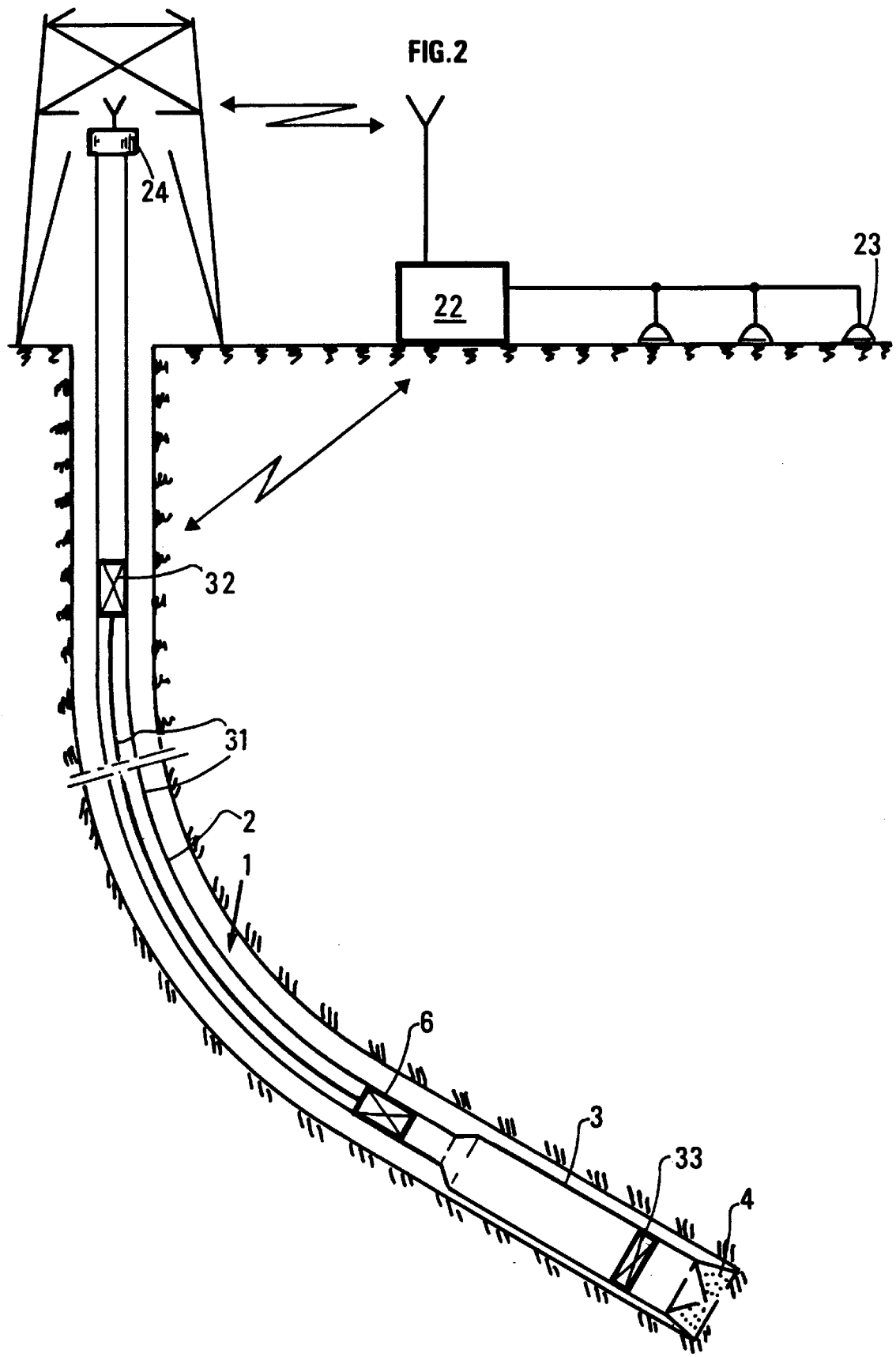
FIG. 2 also diagrammatically shows a variant.

The relative layouts of the main means of the invention are diagrammatically shown in FIG. 2: sub 6 comprising the downhole measuring means, surface measuring means 23, surface electronic means 20, drill bit 4, drill collars 3, storage module 32. In this variant, downhole measuring means 7 are not set at the level of the drill collars but higher up in the pipes. Sub 6 is then suited to be connected mechanically between two drillpipes. The mechanical coupling of the pickup with the string is such that the vibrations generated by the rotation of bit 4 or the seismic waves created by a surface vibration source can be detected by the pickup or pickups of sub 6. A cable 31, for example of the measuring or logging cable type, connects sub 6 to the storage module 32 fastened higher up in the drillpipe string. This module is not simply limited to a memory and to its associated electronics, it also comprises an antenna for receiving the electromagnetic waves sent by the surface electronic means 22. Furthermore, it will be advantageous for this module to comprise substantially all of the measuring electronics, with the exclusion of the sensitive elements such as the pickup 7 of sub 6.

A mechanical damping means 33 is preferably inserted between bit 4 and the downhole measuring means.

The layout according to FIG. 2 can notably afford the advantage of setting the measuring means at a lesser depth in the wellbore, but at a sufficient distance from the well bottom to get geologic information on the formations while drilling. Furthermore, the length of cable 31 allows the storage means to be brought closer to the surface and therefore to facilitate access thereto in order to take the recorded signals to the surface. The reception of the synchronization code will also be easier since the antenna (in module 32) is closer to the emission means contained in the surface electronic means 22.

For example, in case of drilling in high temperature and/or high pressure wells, the invention can be more readily implemented with the layout illustrated in FIG. 2 thanks to the position of the downhole measuring means, further away from the extreme conditions, which also applies to the storage module.

The device described above can be operated and used as follows:

A drill string is lowered into a well in order to deepen it. The string comprises a storage module that is already set on connector 8 if the latter is equipped therewith. An acceleration pickup detects the vibrations, preferably in the longitudinal direction, due to the rotation of drill bit 4 on the working face or due to another seismic source. This other source can be situated within the BHA, preferably as close as possible to the bit. In another mode, close to what is referred to as VSP or vertical seismic profiling, the vibration source is actuated from the surface and the downhole pickup records the seismic waves generated. In this application, the rotation and the drilling fluid circulation are preferably stopped during recording in order to limit the noise, the bit lying on the working face, with a low weight. It is clear that the present invention applies both for listening to the noise of the drill bit and for obtaining a seismic profile in a well (vertical or not).

The vibrations detected by the downhole measuring means are recorded in the storage module, unprocessed or possibly after certain electronic processings, and provided with time position data. In fact, as the operator activates the acquisition of measurements, a synchronization information or code is sent through the electromagnetic transmission means. The same synchronization information is asigned to the signals read by geophones 23 and/or by the surface pickups, for example 24. Thus, the vibrations collected by the surface means can be correlated synchronously with the vibrations detected by downhole measuring means. The same applies to the vibrations recorded by surface pickups 24 at the top of the drill string.

Throughout the duration of the acquisition, the storage module stores the information, maybe until it substantially reaches saturation. When the memory is full, the downhole electronic means 21 can send a signal to the surface by electromagnetic wave in order to inform the surface operator that the memory needs purging. The acquisition time can also be sufficient for the operator to know about the degree of saturation of the memory.

The operator then selects one of these operational stages:
by means of a measuring cable, he lowers into the string a connecting tool intended to cover the full storage module. After connection, the surface electronic means to which the measuring cable is connected activate the transfer of the stored signals towards a surface memory. Once purged, the downhole memory is operational for the following operations;

by means of a simple wireline, i.e. without an electric conductor, a fishing tool intended for the recovery of the full module, according to well-known fishing techniques, is lowered. In this case, the storage module is equipped with a connector 8 that can be plugged in, or equivalent, for connection with sub 6. The operator thereafter sets a second module, or the same module after it has been copied and purged (this method is in some cases too long to be advantageous). Setting an empty module at the bottom of the well can be performed by lowering with a wireline, but it will be preferably achieved by dropping the module in the inner space of the string filled with drilling fluid. The module is automatically connected to pickup 7 through the cooperation of connectors 13 and 8, as it is well-known.

It can be noted that, in case of a combination of the two stages described above, the memory can be cleared in order to collect information at the surface during the ascent of the module, which allows to save time.

Of course, recovery of the information stored in the memory can be achieved by taking the string up to the surface, i.e. by breaking the pipes down one after the other.

When the signals corresponding to the vibrations collected at the bottom, acquired during a certain drilling interval, are taken to the surface and available to the surface operator, the latter can perform, with the aid of processing means, correlations with the vibrations acquired by the surface means, after previously fining down or adjusting the synchronization of the downhole records with the surface records.

One can notice the advantageous combined use of the electromagnetic transmission for controlling, monitoring, synchronizing the high-capacity acquisition of signals, without the transmission means being dimensioned to transmit a great volume of information such as that which can be stored in the storage module.

Although it may be considered that the transmission by electromagnetic wave is quasi-instantaneous, the electromagnetic waves used in drilling have the disadvantage of being low-frequency waves, with a high-frequency cutoff of about 5 Hz during drilling and about 10 to 20 Hz at standstill. In case of seismic measurements, it can be preferable to overcome this imprecision by recording on the drill string, for examples with means 24, the vertical component of the acceleration, the rotation acceleration, the pressure of the drilling fluid injected or a combination of these measurements. These information can be correlated with the downhole signal acquired by means of downhole pickups 7. The transfer function of the drill string can thus be obtained for various string lengths. The transfer function shifts in time, each time a pipe is added, by a measurable delay smaller than the synchronization error made during recording, because of the low frequency of the electromagnetic control waves. This imprecision is of the order of one tenth of a period T, i.e. 20 ms for a 5 Hz wave.

This error can be minimized to a common constant, for each addition of drillpipes to the string, by checking off the arrival of the direct guided wave and the arrival of the first order multiple guided wave: the time difference for this multiple corresponds in fact to a double travel between the bottom and the surface, independent of the synchronization error. The double travel time is thus obtained for two successive pipes, the difference between the double travels corresponds to the double travel in the pipe added, and consequently to double the single travel difference for the direct bottom-surface arrival. FIG. 3 illustrates the previous point by representing the transfer function T for a given length of the string increased by a pipe length. The series of signals from 0 to n is thus obtained. D corresponds to the direct pressure wave in the steel of the pipes, td being the arrival time of the direct wave, M corresponds to the first order multiple guided wave, tm being the arrival time of this wave. For a given pipe length:

tm−td=2t, t being the travel time between the bottom and the surface, to a constant.

In fact, td=t+q and tm=3t+q, q being the synchronization error due to the low frequency of electromagnetic transmission of the synchronization code and to the drift of the downhole clock in relation to the surface clock, all causes being concurrent.

This method is of course applicable from the longitudinal pressure signals or torsion signals in the steel of the pipes, or pressure signals in the column of drilling fluid injected in the inner space of the pipes.

Since each of the three guided waves in the pipes (longitudinal or shear wave in the steel of the pipes, or pressure wave in the internal column of drilling fluid) has frequencies that can reach about 50 Hz with a good signal-to-noise ratio, it is thus possible to reduce the synchronization error, if need be, in the ratio of the high frequencies of the guided wave (about 50 Hz) to the dominant frequency of the electromagnetic wave (about 5 Hz) that modulates the control and/or synchronization orders of the recordings, i.e. by a factor of about 10. The final error can thus be reduced to about 1/10 of 20 ms, i.e. 2 ms, which is acceptable for exploiting the times read on the signals, in particular for seismic signals, during further processings. FIG. 4 illustrates, by means of a real example, the transfer functions between the bottom and the surface for the three types of waves mentioned above: pressure waves in the steel of the pipes (A), shear waves (B) and pressure waves in the drilling fluid (C), obtained by correlation with at least one downhole acceleration signal, that can be of the same type or of a different type, in successive time intervals of 30 seconds.

We claim:

1. A method for the acquisition of signals during a well drilling operation, comprising the following steps:

creating a vibration with a vibration source, recording a plurality of signals representative of said vibration by at least two sensors, the first sensor of the at least two sensors being placed at a ground surface point and recording a first signal, the second sensor of the at least two sensors being placed in a string used for drilling and recording a second signal, connecting said first sensor to surface electronic control means, emitting an electromagnetic wave synchronization code from an electronic control, recording said code with the first and second signals acquired by said first and second sensors respectively, storing the second signal provided by said second sensor in a storage module for a time interval, recovering the second signal contained in the storage module at the ground surface point at the end of said time interval, and performing synchronization adjustments upon the first and second signals utilizing the recorded synchronization code, whereby the synchronized first and second signals may be further processed to obtain geologic information.

2. A method as claimed in claim 1, wherein the second signal stored in the storage module is recovered by taking the storage module up to the surface.

3. A method as claimed in claim 1, wherein said string comprises a drill bit capable of rotating, the rotating drill bit forms the vibration source, the first sensor is a geophone and the second sensor is an accelerometer.

4. A method as claimed in claim 1, wherein the vibration source lies at the ground surface, and the second sensor detects vibrations crossing the drilled formations.

5. A method as claimed in claim 1, wherein said first sensor is situated at the top of said string and connected to the surface control and records vibrations guided by the string.

6. A method as claimed in claim 1, wherein a cable is lowered into the string, said cable comprising a connecting tool for connection with said storage module.

7. A method as claimed in claim 6, wherein said surface electronic control and said storage module are connected electrically by means of the connecting tool.

8. A method as claimed in claim 1, wherein the step of synchronizing the first and second signals comprises recording the times of arrival at the surface, at a top of the string, said string comprising a pipe made of a steel containing a drilling fluid, of a direct guided vibrational wavetrain and of a first order multiple of the direct guided vibrational wavetrain, said direct guided vibrational wavetrain comprising longitudinal pressure or shear waves in the steel of the pipe, or pressure waves in the drilling fluid injected in the pipe.

9. A device for the acquisition of signals during a well drilling operation, comprising:

a vibration source, a first surface sensor emitting a first signal and being connected, either by radio wave or by electric link, to a surface electronic control, a second sensor, said second sensor being placed in a drilling string and emitting a second signal, said surface electronic control having a code emitter which emits a code by electromagnetic waves for synchronizing said first and second signals at said control, and a storage module which stores the second signal for a given time interval, and said module being connected to said second sensor and being recoverable with the stored second signal at the surface.

10. A device as claimed in claim 9, wherein said second sensor is connected to the storage module by a cable comprising at least one conductor so that the module is at a short distance from the surface, said module having a code receiver and recorder.

11. A device as claimed in claim 9, wherein the storage module comprises at least one electric connector that can be plugged in in a liquid environment.

12. A method as claimed in claim 1, wherein the string comprises a drill bit and the method identifies formation layers in the vicinity of the drill bit by correlating the recorded first signal and the recorded second signal stored in the storage module, followed by a standard processing of the correlated signals.

13. A method as claimed in claim 2, wherein a cable is lowered into the string, said cable comprising a connecting tool for connection with said storage module.

14. A method as claimed in claim 13, wherein said surface electronic control and said storage module are connected electrically by means of the connecting tool.

15. A method as claimed in claim 2, wherein the string comprises a steel pipe having a drilling fluid therein and step of synchronizing the first and second signals comprises recording the times of arrival at the surface, at a top of the string, of a direct guided vibrational wavetrain and of a first order multiple, said wavetrain comprising longitudinal pressure or shear waves in the steel of the pipe, or pressure waves in the drilling fluid in the pipe.

16. A method as claimed in claim 2, wherein the string comprises a drill bit and the method identifies formation layers in the vicinity of the drill bit by correlating the recorded first signal and the recorded second signal stored in the storage module, followed by a standard processing of the correlated signals.

17. A method as claimed in claim 3, wherein the string comprises a drill bit and the method identifies formation layers in the vicinity of the drill bit by correlating the recorded second signal and the recorded first signal stored in the storage module, followed by a standard processing of the correlated signals.

18. A method as claimed in claim 4, wherein the string comprises a drill bit and the method identifies formation layers in the vicinity of the drill bit by correlating the recorded first signal and the recorded second signal stored in the storage module, followed by processing the correlated signals.

19. A method as claimed in claim 5, wherein the string comprises a drill bit and the method identifies formation layers in the vicinity of the drill bit by correlating the recorded first signal and the recorded second signal stored in the storage module, followed by a standard processing of the correlated signals.

20. A method as claimed in claim 6, wherein the string comprises a drill bit and the method identifies formation layers in the vicinity of the drill bit by correlating the recorded first signal and the recorded second signal stored in the storage module, followed by a standard processing of the correlated signals.

21. A method as claimed in claim 7, wherein the string comprises a drill bit and the method identifies formation layers in the vicinity of the drill bit by correlating the recorded first signal and the recorded second signal stored in the storage module, followed by a standard processing of the correlated signals.

22. A method as claimed in claim 8, wherein the string comprises a drill bit and the method identifies formation layers in the vicinity of the drill bit by correlating the recorded first signal and the recorded second signal stored in the storage module, followed by a standard processing of the correlated signals.

23. A process as claimed in claim 1, further comprising the step of processing said first and second signals to obtain geologic information.

24. A device as claimed in claim 9, wherein the electronic control identifies geologic formations by correlating the first and second signals.

* * * * *